United States Patent [19]

Cooksey

[11] B 3,914,654

[45] Oct. 21, 1975

[54] DEFLECTION AMPLIFIER

[75] Inventor: John Andrew Cooksey, Binghamton, N.Y.

[73] Assignee: The Singer Company, New York, N.Y.

[22] Filed: Apr. 6, 1973

[21] Appl. No.: 348,495

[44] Published under the Trial Voluntary Protest Program on January 28, 1975 as document no. B 348,495.

Related U.S. Application Data

[63] Continuation-in-part of Ser. No. 268,038, June 30, 1972, abandoned.

[52] U.S. Cl. ................. 315/408; 315/397; 315/403

[51] Int. Cl.² .......................................... H01J 29/70

[58] Field of Search ......... 315/27 R, 27 TD, 28, 29, 315/26, 24, 408, 397, 403

[56] References Cited

UNITED STATES PATENTS

| | | | |
|---|---|---|---|
| 3,541,385 | 11/1970 | Rothermel | 315/27 TD |
| 3,628,083 | 12/1971 | Holmes | 315/27 TD |
| 3,714,503 | 1/1973 | West | 315/27 TD |

*Primary Examiner*—T. H. Tubbesing

*Assistant Examiner*—J. M. Potenza

*Attorney, Agent, or Firm*—James F. Duffy; James C. Kesterson

[57] ABSTRACT

A high speed electromagnetic deflection amplifier having switching means for reducing the power requirement of the amplifier by connecting an energy storage capacitor in series with the deflection coil and the amplifier during retrace time.

5 Claims, 3 Drawing Figures

DEFLECTION AMPLIFIER

This is a continuation-in-part of the application having Ser. No. 268,038 filed on June 30, 1972 now abandoned.

BACKGROUND OF THE INVENTION

1. Field of the Invention

This invention relates to amplifiers for driving an inductive load and more particularly to a magnetic deflection amplifier for providing a current having a generally sawtooth waveform through a deflection coil of a cathode ray tube.

2. Description of the Prior Art

In one type of cathode ray tube display, the beam of a cathode ray tube traces a multiplicity of evenly spaced horizontal lines across the face of the tube. The multiplicity of lines is known in the art as a raster and the lines are referred to as raster lines.

The raster is typically provided by deflecting the beam during a trace time from left to right across the face thereby causing the tracing of a raster line. After the trace time, the beam is rapidly deflected during a retrace time to the left side of the face to a position associated with the start of a trace of a succeeding raster line.

In commercial television, typically a resonant energy deflection circuit provides current through a deflection coil to deflect the beam to trace the raster. The resonant energy circuit is usually comprised of a retrace capacitor which is connected across the deflection coil and a storage capacitor which stores a substantially constant voltage. During the trace time, a switch, such as a transistor, substantially connects the storage capacitor across the deflection coil. The substantially constant voltage across the deflection coil causes a current therethrough having a waveform of a substantially linear ramp whereby the beam is deflected across the face. At the end of the trace time, the deflection coil conducts a maximum current therethrough. When the deflection coil conducts the maximum current, the switch disconnects the storage capacitor.

Because of the maximum current being conducted therethrough, a maximum amount of energy is stored in the magnetic field of the deflection coil. During the retrace time, the energy is transferred to the retrace capacitor and then transferred back to the deflection coil. At the end of the retrace time the maximum current is provided in an opposite direction from the current at the start of the retrace time whereby the beam is deflected to a position associated with the start of the trace of the succeeding raster line.

Usually the retrace time is very short compared with the trace time. Therefore, the current changes rapidly during the retrace time since the change is from the maximum in one direction to the maximum in the opposite direction. Because the current changes rapidly, the deflection coil provides a high voltage during a portion of the retrace time.

A comparably high voltage source is required to provide for this and the active element comprising the amplifier must be capable of withstanding such high voltages without breakdown. In general, cost and instability increase with high voltage handling criteria.

Although resonant energy circuits use very little power and are economically constructed, they are only useful when the trace current has the waveform of a substantially linear ramp.

Therefore, if the trace current required has a generally rising waveform but is of variable shape, as is often required for specific visual displays, the reactive responses of such resonant devices obviate their use for such applications.

In another type of deflection circuit an operational amplifier provides the current through the deflection coil. A sampling voltage proportional to the current through the deflection coil is fed back to the input of the operational amplifier whereby the current is in accordance with an input voltage provided to the operational amplifier. The operational amplifier must have the capability of providing the high voltage referred to hereinbefore. Operational amplifiers are typically not suitable for providing high voltages.

Heretofore, apparatus for providing a deflection current to a deflection coil either provides a substantially linear ramp of current or is comprised of an operational amplifier which must provide a high voltage.

SUMMARY OF THE INVENTION

An object of the present invention is to provide a current having a substantially sawtooth waveform through an inductor.

Another object of the invention is to provide a current having a substantially sawtooth waveform through a coil where a trace portion of the current may be substantially non-linear.

A further object of the present invention is to provide a deflection amplifier which provides a current having a substantially sawtooth waveform through a coil where the deflection amplifier does not have to provide a high voltage during retrace time.

According to the present invention, the output of an operational amplifier, for example, is connected through a switch to an inductor, an input of said amplifier being connected to receive a feedback signal proportional to current flowing through said inductor; in response to a sawtooth signal, having trace and retrace portions during trace and retrace times, respectively, being applied to an input of said amplifier, said switch substantially connects said amplifier to said inductor during said trace time whereby said current has substantially the same waveform as said trace portion, and said switch substantially disconnects said inductor from said amplifier during said retrace time and simultaneously connects a retrace capacitor in series with said inductor and said amplifier whereby energy stored in said inductor coil is transferred to said retrace capacitor and then transferred back to said coil.

Deflection amplifiers constructed in accordance with one embodiment of the present invention comprises an operational amplifier which is protected by a switching means and a retrace capacitor from high voltages which are provided by a deflection coil.

DESCRIPTION OF THE PREFERRED EMBODIMENT

Figure 1:
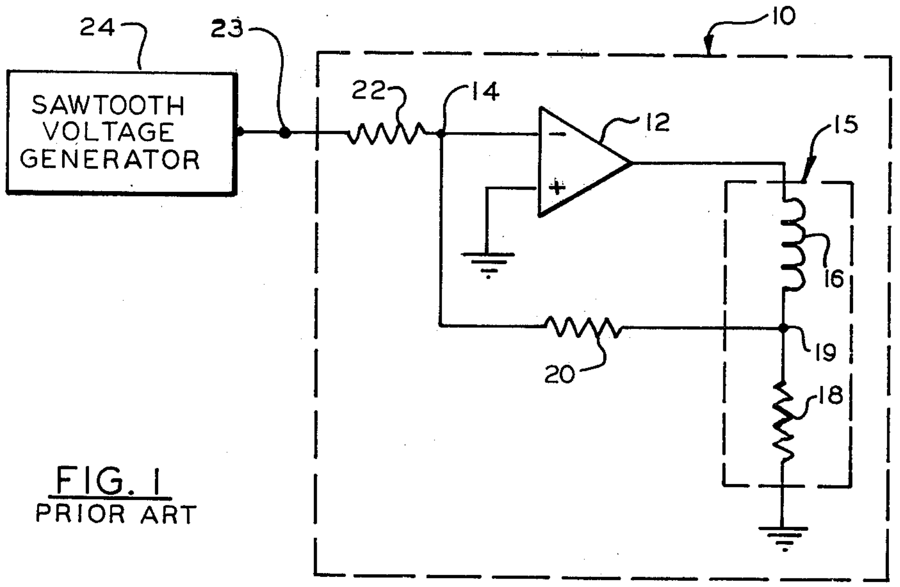
FIG. 1 is a schematic diagram of a deflection amplifier known in the prior art.

Referring now to FIG. 1, a deflection amplifier 10, which is of a type well known in the prior art, is comprised of, for example, an operational amplifier 12 which has inverting and non-inverting inputs respectively connected to a summing junction 14 and ground. As is known to those skilled in the art an operational amplifier has very high voltage and current gains whereby substantially no current flows into the inputs of the operational amplifier 12. Additionally, the inputs are maintained at substantially the same potential whereby a virtual ground is provided at the junction 14.

The output of the operational amplifier 12 is connected through a load 15 to ground. The load 15 is comprised of a deflection coil 16 (connected to the output of the amplifier 10) in series with a sampling resistor 18 (having one end connected to ground) which has a resistance typically on the order of one ohm. The junction of the coil 16 and the resistor 18 form a feedback input 19 which is connected to the junction 14 through a feedback resistor 20.

The junction 14 is additionally connected through an input summing resistor 22 to a sweep input terminal 23 which is connected to the output of a sawtooth voltage generator 24. Because no current flows into the inputs of the operational amplifier 12 and a virtual ground is provided at the junction 14, substantially the same current flows through the resistors 20, 22. The current flowing through the resistors 20, 22 is in accordance with ohms law and is only dependent upon the resistance of the resistor 22 and the voltage provided by the generator 24. Therefore, in response to a voltage having a sawtooth waveform being provided by the generator 24, a current having a sawtooth waveform is conducted through the resistors 20, 22.

Figures 2, 2A, 2B, 2C, 2D, 2E, 2F:
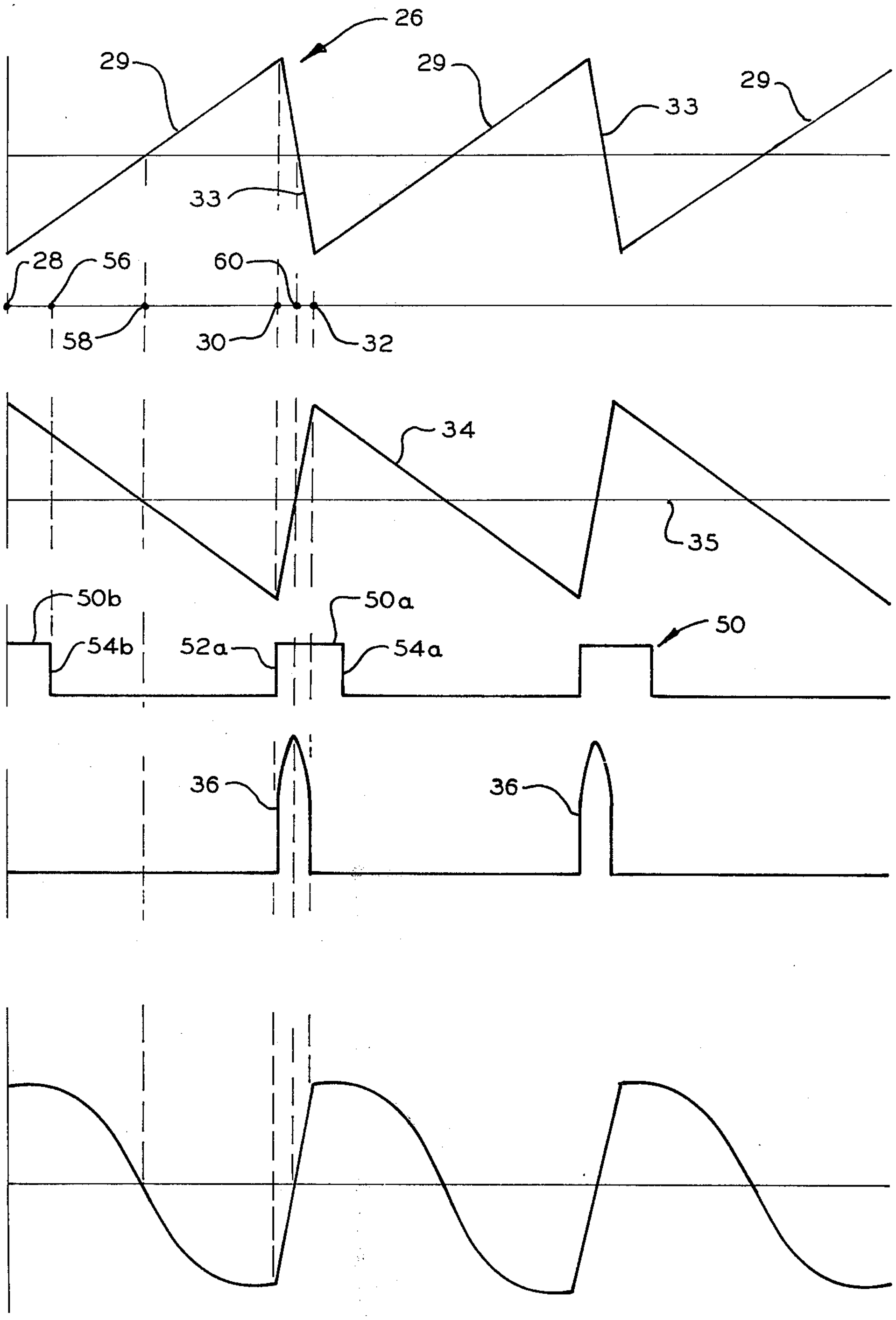
FIGS. 2*a*, 2*b* and 2*c* respectively show typical input voltage timing base and output current relationships associated with CRT deflection circuits.
FIG. 2*d* illustrates the voltage appearing across retrace capacitor 25 of FIG. 3.
FIG. 2*e* illustrates the output of the sync pulse generator 48 of FIG. 3.
FIG. 2*f* illustrates a waveform, nonlinear with respect to time, which this invention can reproduce faithfully.

Referring now to illustration *a*, FIG. 2, the sawtooth voltage provided by the generator 24 is represented by a waveform 26. Illustration *b*, FIG. 2 is a representation of a time base of the waveform of FIG. 2 whereon a point 28 is representative of the time of the beginning of a trace portion 29 of the waveform 26 and a point 30 is representative of the time of the end of the trace portion 29. The time from the beginning to the end of the trace portion 29 is referred to as a trace time hereinafter.

During the trace time the trace portion 29 is representative of a change from a maximum voltage of one polarity to a maximum voltage of the opposite polarity. During a retrace time (usually shorter than the trace time) starting at a time represented by the poing 30 and ending at a time represented by a point 32 the waveform 26 has a retrace portion 33 which is representative of a change back to the maximum voltage associated with the point 28.

Because the resistors 20, 22 (FIG. 1) have substantially the same current therethrough and a virtual ground is provided at the junction 14, provided at the feedback input 19 is a sampling voltage having a sawtooth waveform which is represented by a waveform 34 of illustration *c*, FIG. 2. The waveform 34 has trace and retrace portions during representations of the trace and retrace times, respectively.

The sampling voltage is caused by the operational amplifier 12 providing a load current through the load 15 (which causes a current through the resistor 20 equal to the current through the resistor 22 as described hereinbefore). Therefore, the waveform 34 is representative of the load current. Because the load current changes rapidly during the retrace time, the operational amplifier 12 provides a very high voltage proportional to the product of the inductance of the coil 16 and the rate of change of the load current with respect to time.

Figure 3:
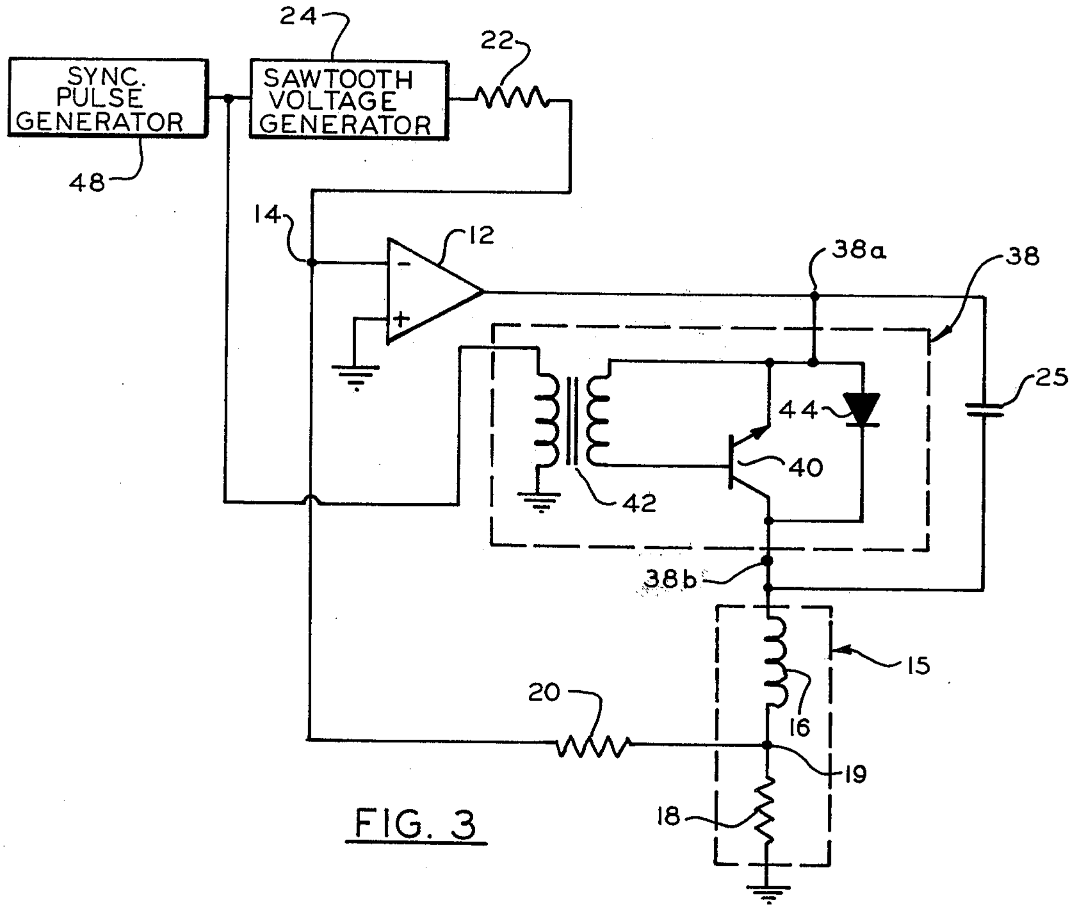
FIG. 3 is a schematic diagram of a preferred embodiment of the present invention.

Referring now to FIG. 3, in the preferred embodiment of the present invention the output of the operational amplifier 12 and the load 15 are connected to a switch 38 at terminals 38*a*, 38*b* thereof respectively, whereby the operational amplifier 12 is connected through the switch 38 to the load 15. The switch 38 is comprised of a transistor 40, the collector and the emitter thereof being respectively connected to the terminals 38*b* and 38*a*. The collector and the emitter are additionally connected to a diode 44 at the cathode and the anode thereof, respectively.

The switch 38 is responsive to pulses provided to the primary of a transformer 42, which has a secondary winding with ends thereof respectively connected to the emitter and the base of the transistor 40. The connection of the primary winding of the transformer 42 is described hereinafter.

Additionally connected to the output of the amplifier 12 is one side of a retrace capacitor 25, the other side being connected to the load 15. During the retrace time energy stored in the coil 16 is transferred to the capacitor 25 and then transferred back to the coil 16 as described hereinafter.

In the preferred embodiment, the input of the sweep voltage generator 24 is connected to the output of a sync pulse generator 48 which provides sync pulses. In response to the leading edge of a sync pulse, one cycle of the sawtooth voltage is provided by the sweep voltage generator 24.

Referring now to illustrations *c* and *e*, FIG. 2, a waveform 50 is a representation of the sync pulses which includes a pulse 50*a* having a leading edge 52*a* which occurs at a time represented by the point 30. Additionally included is a trailing edge 54*a* which occurs after the retrace time but at a time when the waveform 34 has the polarity associated with the point 32.

The output of the pulse generator 48 is additionally connected through the primary winding of the transformer 42 to ground. In response to a sync pulse, the transformer provides a base to emitter voltage which causes nonconduction from the collector and to the emitter. In the absence of a sync pulse the transformer provides a base to emitter voltage causing conduction from the collector to the emitter whereby transistor 40 substantially connects the load 15 to the operational amplifier 12.

The teachings of the present invention are explained by assuming that at the time represented by the point 28 (illustration *b*, FIG. 2) a trace portion of the load current (corresponding to the waveform 34 at the time represented by the point 28) flows through the load 15 via the diode 44. It should be understood that at the time represented by the point 28, the transistor 40 is nonconductive because a sync pulse is provided which is represented by a pulse 50*b* having a trailing edge 54*b* (illustration *e*, FIG. 2).

At a time represented by a point 56 the sync generator 48 provides the trailing edge represented by the edge 54*b*. Since there is an absence of a sync pulse after the time represented by the point 56, the transistor 40 and the diode 44 are concurrently conductive. It should thus be understood that the location of the point 56 is not critical because diode 44 is then conducting. At a time represented by 58, the coil current 34, in response to input voltage 29, has decayed to zero and begins to increase in magnitude again. Its polarity is reversed however, and current 34 now flows through coil 16 in a direction opposite to that in which it flowed at the start of the trace. This causes diode 44 to become nonconductive whereby trace current 34 flows only through transistor 40. Note that regardless of the polarity of the trace current 34, current will flow through transistor 40 unless the transistor is biased off by sync pulse generator 48. Thus transistor 40 as used in this invention may be defined as a bipolar switch. Similarly, diode 44, which ceases conduction when trace current 34 reverses polarity, may be denoted a unipolar switch. It should be understood that because of the flow of the trace current, energy is stored in the coil 16 in accordance with a relationship which is given as:

$$E = 1/2\ Li^2$$

where, $E$ is the stored energy;

$L$ is the inductance of the coil 16; and $i$ is the trace current in the coil 16

At the time represented by the point 30, a retrace portion of the load current is provided and the sync pulse represented by the pulse 50*a* causes the nonconduction of the transistor 40. During the retrace time the retrace current causes the coil 16 to provide at the terminal 38*b* a voltage more positive than the voltage provided at the terminal 38*a* causing the diode 44 to be nonconductive because the cathode is more positive than the anode thereof. Since the diode 44 and the transistor 40 are both nonconductive during the retrace time, the switch 38 is nonconductive whereby the operational amplifier 12 is connected to the load 15 only through the capacitor 25.

During the retrace time, the retrace current flows through the coil 16, the capacitor 46 and the operational amplifier 12 whereby the energy stored in the coil 16 is transferred to the capacitor 46 from the beginning of the retrace time to a time represented by a point 60. The energy stored in the capacitor 25 is then transferred back to the coil 16 from the time represented by the point 60 to the end of the retrace time. Thereafter, the trace current is provided as described hereinbefore. The charge and discharge of capacitor 25 is shown in illustration d of FIG. 2. The peak voltage of waveform 36 is typically on the order of 100 volts or more.

It should be understood that the capacitor 25 is typically selected to cause the combination therewith of the coil 16 to have a natural period twice as great as the retrace time whereby the transfer of energy between the capacitor 25 and the coil 16 is in accordance with the natural period.

According to the present invention, the switch 38 disconnects the coil 16 from the operational amplifier 12 during retrace time and simultaneously connects a retrace capacitor 25 in series with said coil 16 and said amplifier 12 whereby energy stored in said coil 16 is transferred to said retrace capacitor 25 and then transferred back to said coil 16. Operation of switch 38 permits retrace current to flow through operational amplifier 12 but said amplifier 12 need have a capability of providing only low voltages.

It should be understood, that trace currents provided through the coil 16 are in accordance with trace portions of the sawtooth voltage provided by the generator 24. Accordingly, the improved deflection amplifier may provide a load current with the trace portion of the waveform thereof being substantially nonlinear. The load current may, for example, have a waveform which is represented by a waveform 62 of illustration *f*, FIG. 2.

Thus there has been shown apparatus for providing through a deflection coil a current having a generally sawtooth waveform.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of my invention, that which I claim as new and desire to secure by letters patent of the United States is:

1. In combination with an electronic system wherein an amplifier with an input voltage having a variable but generally rising waveform causes a current having the same wave shape to flow through an inductor coil thereby generating a magnetic field to deflect the beam of a CRT, said system having a retrace capacitor to conserve the energy stored in the inductor and a nonreactive feedback path by which a sample of the output signal developed across a resistor is returned to the input circuitry comprising:

switching means operable to connect said retrace capacitor in series with said amplifier and said inductor during retrace time, the current conduction path for the transfer and retransfer of energy between said inductor and capacitor thereby being through said amplifier; and further operable to disconnect said retrace capacitor such that the said amplifier output is connected directly to said inductor during trace time; and synchronizing means operable to control the time of start of said input voltage waveform and the operation of said switching means.

2. An electronic system according to claim 1, said switching means comprising:

a bipolar switch operable upon sync command; and a unipolar switch self operable according to the sense of the polarity of the load current.

3. A deflection amplifier according to claim 2 wherein said unipolar switch comprises a diode.

4. A deflection amplifier according to claim 2 wherein said bipolar switch comprises a transistor.

5. A deflection amplifier according to claim 1 wherein said storage means comprises a capacitor.

* * * * *

UNITED STATES PATENT OFFICE
CERTIFICATE OF CORRECTION

Patent No. 3,914,654 Dated October 21, 1975

Inventor(s) John A. Cooksey

It is certified that error appears in the above-identified patent and that said Letters Patent are hereby corrected as shown below:

Col. 1, line 59, should not begin a new paragraph, but rather should follow period on line 58.

Col. 5, line 7, start new paragraph with "At".

Col. 5, line 44, "46" should be --25--.

Col. 5, line 46, "46" should be --25--.

Signed and Sealed this

*ninth* Day of *March 1976*

[SEAL]

*Attest:*

RUTH C. MASON
*Attesting Officer*

C. MARSHALL DANN
*Commissioner of Patents and Trademarks*